United States Patent [19]

Masai et al.

[11] Patent Number: 4,937,784
[45] Date of Patent: Jun. 26, 1990

[54] DISTRIBUTED INTERACTIVE PROCESSING METHOD IN COMPLEX SYSTEM INCLUDING PLURAL WORK STATIONS AND PLURAL HOST COMPUTERS AND APPARATUS USING THE SAME

[75] Inventors: Kazuo Masai, Yokohama; Kimitoshi Yamada, Hadano; Tomihiko Kojima, Machida; Ikuo Kimura, Yamato, all of Japan

[73] Assignee: Hitachi, Ltd., Tokyo, Japan

[21] Appl. No.: 56,654

[22] Filed: Jun. 2, 1987

[30] Foreign Application Priority Data

Jun. 2, 1986 [JP] Japan .................................. 61-125726

[51] Int. Cl.$^5$ ....................... G06F 15/16; G06F 15/62
[52] U.S. Cl. ..................................... 364/900; 364/200
[58] Field of Search ................................ 364/200, 900

[56] References Cited

U.S. PATENT DOCUMENTS

| | | | |
|---|---|---|---|
| 4,447,871 | 5/1984 | Terada et al. | 364/200 |
| 4,466,063 | 8/1984 | Segarra et al. | 364/200 |
| 4,503,499 | 3/1985 | Mason et al. | 364/200 |
| 4,589,068 | 5/1986 | Heinen, Jr. | 364/300 |
| 4,614,841 | 9/1986 | Babecki et al. | 379/98 |
| 4,636,947 | 1/1987 | Ward | 364/200 |
| 4,665,501 | 5/1987 | Saldin et al. | 364/900 |
| 4,720,828 | 11/1988 | Jones | 370/94 |
| 4,751,630 | 6/1988 | Kelley, Jr. et al. | 364/200 |
| 4,761,642 | 8/1988 | Huntzinger | 340/747 |
| 4,769,771 | 9/1988 | Lippmann et al. | 364/200 |
| 4,791,566 | 12/1988 | Sudama et al. | 364/200 |
| 4,837,701 | 6/1989 | Sanson et al. | 364/464.03 |

FOREIGN PATENT DOCUMENTS 144839 7/1985 Japan .

Primary Examiner—Andrew J. James
Assistant Examiner—Viet Q. Nguyen
Attorney, Agent, or Firm—Antonelli, Terry, Stout & Kraus

[57] ABSTRACT

A distributed interactive processing in a complex computer system including a plurality of work stations (IWS's), each having predetermined server processes, at least a host computer (HOST), communication lines interconnecting between the plurality of IWS's and the HOSTs, and communication control portions to establish and to control communication paths between processes to conduct a process-to-process communication between the IWS's and the HOSTs. Each IWS has therein a process to implement an assigned processing request and a request control section to analyze the processing request issued by the own IWS and to determine a server process required to implement the processing request. Among a result of the request analysis, a predetermined server process is executed in the own IWS. The communication control portions establish a communication path between an associated server process in the relevant HOST and the request process in the IWS in accordance with the determination in the IWS regarding server process and thereby enable the IWS to perform an on-line interactive processing in combination of the server process in the HOST and the process in the IWS.

7 Claims, 9 Drawing Sheets

DISTRIBUTED INTERACTIVE PROCESSING METHOD IN COMPLEX SYSTEM INCLUDING PLURAL WORK STATIONS AND PLURAL HOST COMPUTERS AND APPARATUS USING THE SAME

BACKGROUND OF THE INVENTION

The present invention relates to a complex system including intelligent work stations and host computers (to be simply referred to as "hosts" herebelow) connected by a micro main frame connection therebetween, and in particular, to a distributed interactive processing method suitable to distribute the load on the hosts to the intelligent work stations (referred to as "IWS's" herebelow).

In an interactive processing system such as the time sharing system (TSS), for the user's request issued from a terminal equipment, the syntactical check has been effected on the terminal side as described in the JP-A-60-144839. However, the request itself is analyzed in the virtual address space of a host computer to select a program satisfying the request in the same space. The selected program first arranges the necessary environment, for example, allocates file and effects an OPEN processing thereon, and then executes the requested processing.

Although the TSS is suitable for an irregular job including various kinds of data, the processing is attended with a large overhead and the number of terminals to be simultaneously supported is limited. The TSS of this kind has been well known. For example, refer to Watson, R. W. "TSS Design Concepts" McGraw Hill Computer Science Series McGraw-Hill Book Co. NY. 1970.

In the transaction processing system (on-line system), a request is issued from a terminal in a small unit called a transaction to a host computer. A transaction executes a processing in accordance with the request in a fixed fashion in a space where the pertinent environment is arranged in advance.

In the transaction processing system, the processing is effected in the unit of transaction, namely, in an intermittent manner and in a fixed fashion. Consequently, this system is suitable for use with an automatic banking machine and the like of a bank; however, the transaction processing system is not suitable for an irregular job including various kinds of unfixed data.

In other words, as shown in FIG. 8, regular job requests supplied from a great number of terminals, for example, several thousands in number are processed in a fixed fashion. The host is provided with a data communication program to be effected by a terminal control section and job programs each for achieving a regular or fixed job and an input from a terminal is processed by a job program structured for a fixed purpose.

In the TSS, as shown in FIG. 9, request indications inputted from a relatively small number of terminals i.e. about 100 in number are received in a logical space disposed for each terminal and is subjected to a request analysis, and then a processing program is loaded for execution. In the host, there are provided a terminal control program, a request analysis program to analyze requests from the respective terminals, and processing programs corresponding to the respective requests. Since the request analysis program and the processing programs are prepared for each terminal, the TSS is suitable for an irregular job handling various kinds of data.

In the TSS and the transaction processing system, a terminal is assigned to a host computer and cannot be easily allocated to be commonly or randomly shared among a plurality of host systems.

In the TSS of the conventional technology, although the syntactical check may be considered to be achieved in a terminal equipment, the request analysis cannot be implemented therein; consequently, there is provided a process (virtual address space) for each terminal to execute programs therein, namely, the request from a terminal is analyzed in the space and the processing environment is established in the same space, thereby executing a processing associated with the request. As a result, although the TSS is suitable for the irregular job to process various kinds of unfixed data, a large load is imposed on the host, which therefore cannot simultaneously process the requests from many terminals.

Furthermore, in the transaction processing system, there does not exist a connection between a terminal and a particular process (space) of the host computer, namely, there is not allocated a processing space dedicated to each terminal, and a routine or regular processing is effected in an intermittent fashion. Consequently, the load on the host can be reduced; however, irregular requests cannot be freely processed in the transastion processing system.

Moreover, in a system including a plurality of host computers, a terminal is required to be connected to a particular host before starting an interactive processing, which leads to a problem that terminals cannot concurrently and arbitrarily access a plurality of hosts for the services thereof.

SUMMARY OF THE INVENTION

It is therefore an object of the present invention to provide a distributed interactive processing method and an apparatus using the same in a complex computer system suitable for an irregular job handling various kinds of unfixed data and capable of minimizing a load on the hosts by distributing the load to intelligent terminals.

The object can be accomplished by a method in which a plurality of server processes (virtual address spaces) are provided in the host corresponding to the respective requested and based on a result of an analysis conducted on a processing request in an intelligent terminal, the processing request for other than the intelligent terminal is transmitted to a particular server of a particular host corresponding to the processing request, thereby enabling the server to execute the processing.

A user's request issued in an intelligent terminal is analyzed in the work station. When the work station recognizes that a particular server process in a particular host is necessary, a connection to the particular objective server process is established by means of a communication between processes. The server process sequentially receives processing requests from the process of the work station thus connected. Since the server process is a process prepared to realize or implement a predetermined kind of request, the processing can be effected without re-establishing the processing environment for each request. Thus, since one server process can receive processing requests from a plurality of terminals the host can assign an address space smaller than the number of the terminals thereby to reduce the address space of hosts.

When the kind of request from the user is changed, a new connection to another server process is established via the IWS and the processing is continued. In this situation, since the communication between processes (program executions) can be achieved with respect to any host, the server process may exist in an arbitrary host, and hence, in the case of a system including a plurality of hosts, the IWS can sequentially issue a request to the server process of each host to interactively perform an operation from the IWS.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

A description will be given of an embodiment of the present invention with reference to the accompanying drawings.

Figure 1:
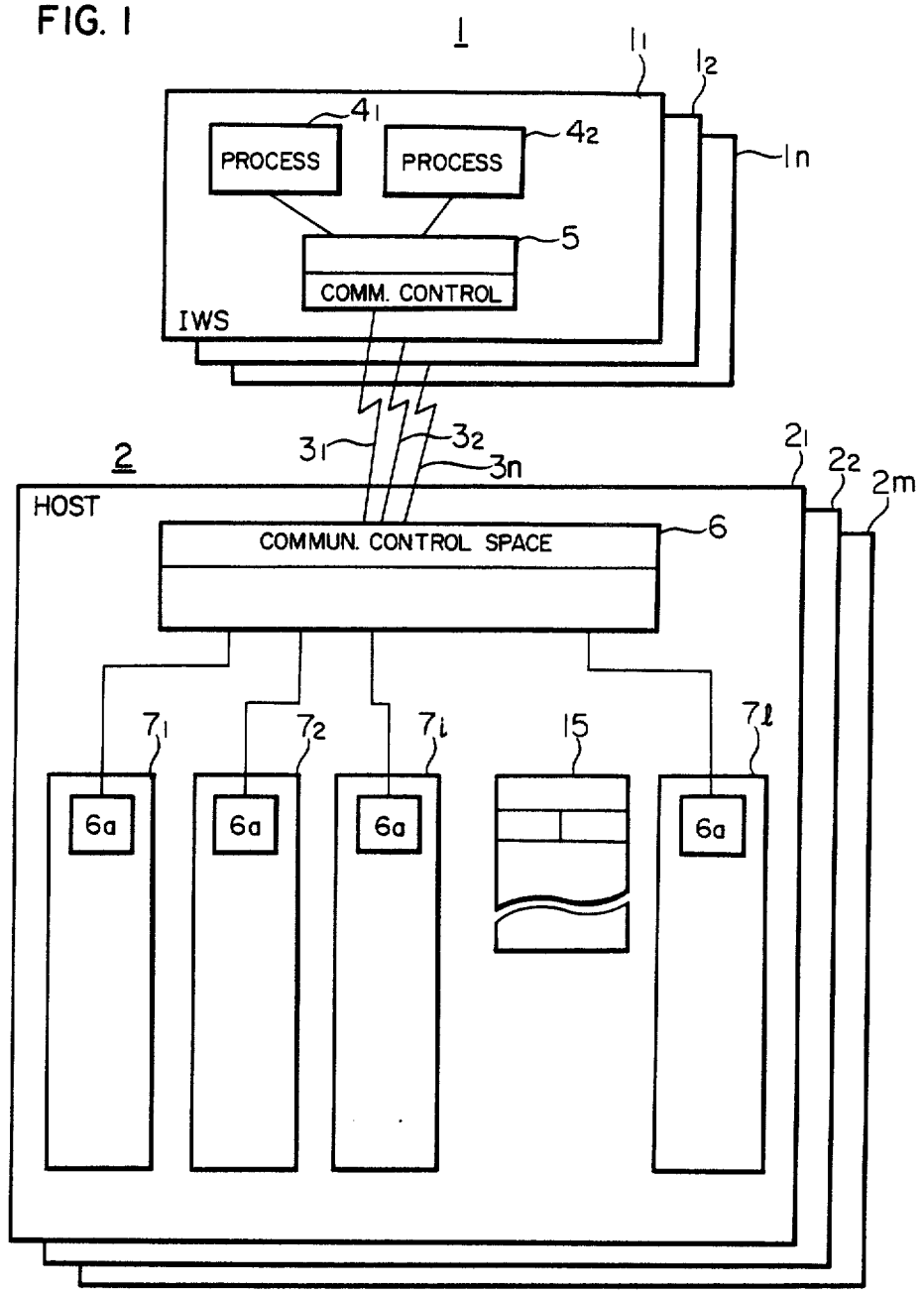
FIG. 1 is an overall system configuration diagram of a complex computer system including intelligent terminals and host computers according to the present invention.

In FIG. 1, there is shown an overall configuration of a distributed interactive processing system which comprises an intelligent work station side 1 and a host computer side 2 connected to each other according to the present invention. Intelligent work stations (IWS's) $1_1$, $1_2, \ldots, 1_n$ in the side 1 are connected to host computers $2_1, 2_2, \ldots, 2_m$ in the side 2 via communication lines $3_i$ (i=1, 2, ..., l). Each IWS $1_i$ includes a plurality of processes $4_i$ each for processing the user's request and a communication control section 5 for controlling communication lines $3_i$. Each host computer comprises a host supervisor (program) providing a communication control space 6 for controlling the communication lines $3_1, 3_2, \ldots$ and a plurality of servers $7_1, 7_2, \ldots, 7_l$ for executing processing associated with the processing requests. The servers $7_1, 7_2, \ldots$ are classified in accordance with the kinds associated with the processing requests from the process $4_i$ in the IWS $1_i$, and a particular request from the process $4_i$ is executed by a particular server $7_i$ corresponding thereto.

Next, referring to FIG. 2 and subsequent diagrams, the operation of the present invention will be described.

Figure 2:
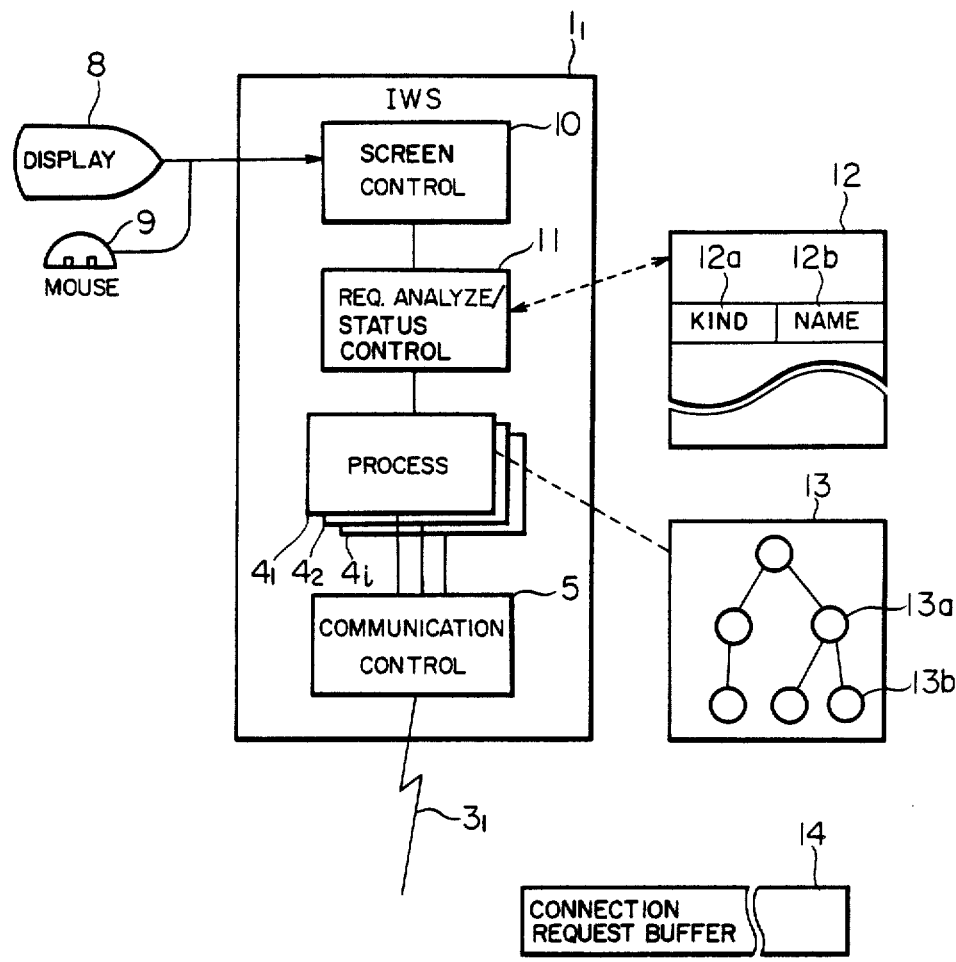
FIG. 2 is a schematic block diagram illustrating the operation on the intelligent work station (IWS) side.

FIG. 2 is a block diagram schematically illustrating processing blocks in the IWS $1_1$ by way of example for IWS. The IWS $1_1$ is connected to a display 8 and a mouse 9 as an input device for specifying a position on the display 8. The end user at the IWS $1_1$ selects by means of the mouse 9 a graphic image called "Icon" displayed on the display device 8 in order to issue a request. The Icon is displayed as a graphic image associated with a name assigned to a resource such as a file, a program, or the like in a meaningful manner, thereby helping the user easily identify the resource. For example, a graphic image or picture illustrating a combination of a report sheet and a table is used as an Icon to represent a file storing data in a table format. The user identifies Icons representing objective files and programs for a desired operation among the Icons displayed on the screen of the IWS $1_1$ and operates the mouse 7 to move the arrowmark cursor to the pertinent Icon on the screen, thereby effecting an operation to select the Icon.

Figures 4, 5:
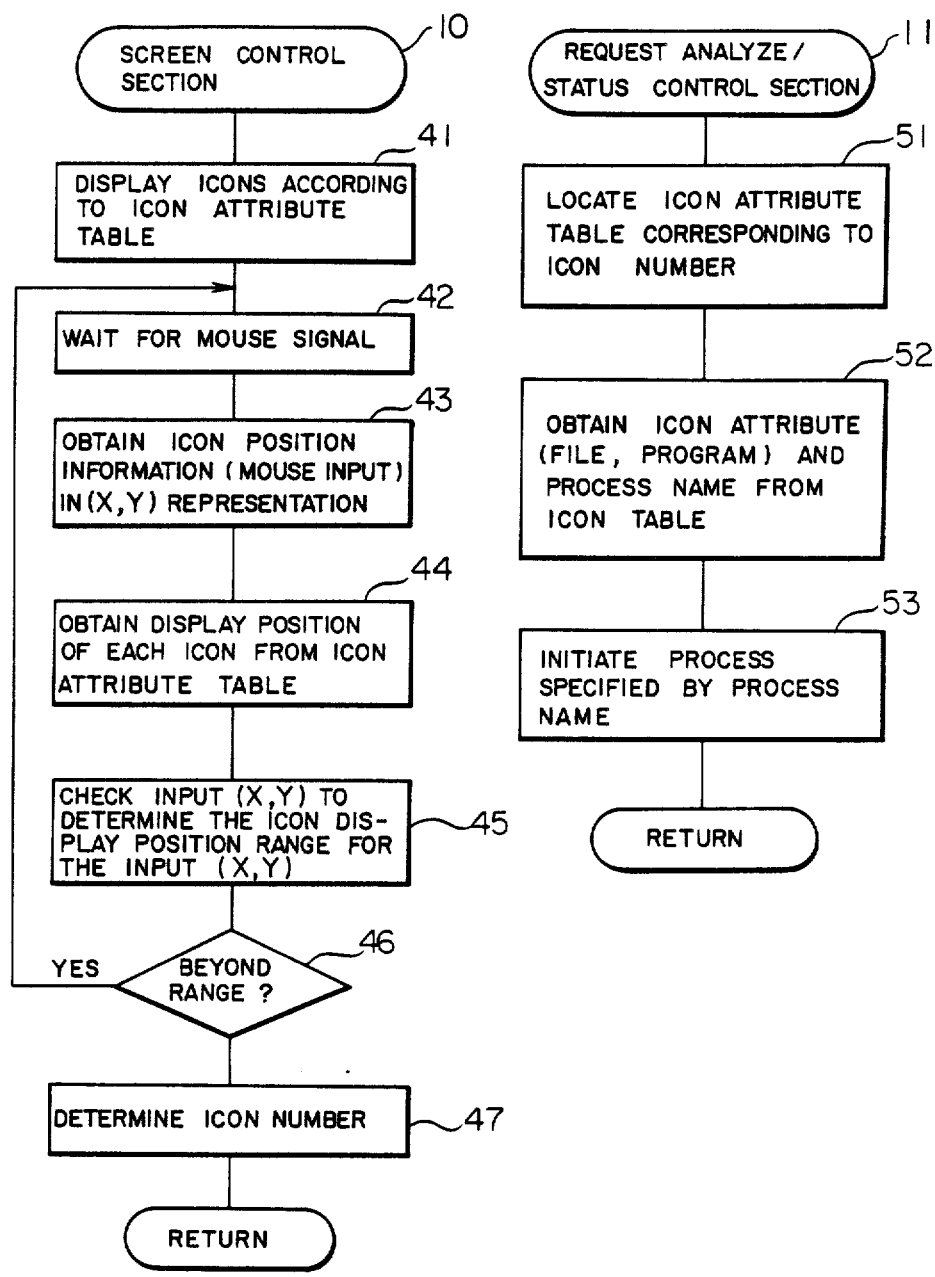
FIGS. 4 to 6 are flow charts respectively for explaining the operations of the screen control section, the request analysis/status control section, and process section of FIG. 2.

When the user selects one of Icons displayed on the screen by the screen control section 10 (step 41 of FIG. 4), the position select signal is inputted from the mouse 9 to the screen control section 10 of the IWS $1_1$, and then the Icon number is obtained through the steps 42–47 of FIG. 4. The request analyze/status control section 11 receives the Icon number and the operation request. As shown in the steps 51–53 of FIG. 5, the request analyze/status control section 11 checks to determine a location where a processing for the selected Icon is to be effected or can be achieved, namely, based on the Icon number, an Icon attribute table 12 stored and developed in the storage of the IWS $1_1$ in advance is searched for a process name corresponding to the relevant Icon. To the Icon attribute table 12, there have been registered entries each including a pair of a kind of Icon 12a and a name of process 12b to implement processings for the Icon. Consequently, the name of the process to execute the processing can be determined by effecting a retrieval through the Icon attribute table 12. The request analyze/status control section 11 initiates a process $4_i$ having the name thus determined (step 53).

Figure 6:
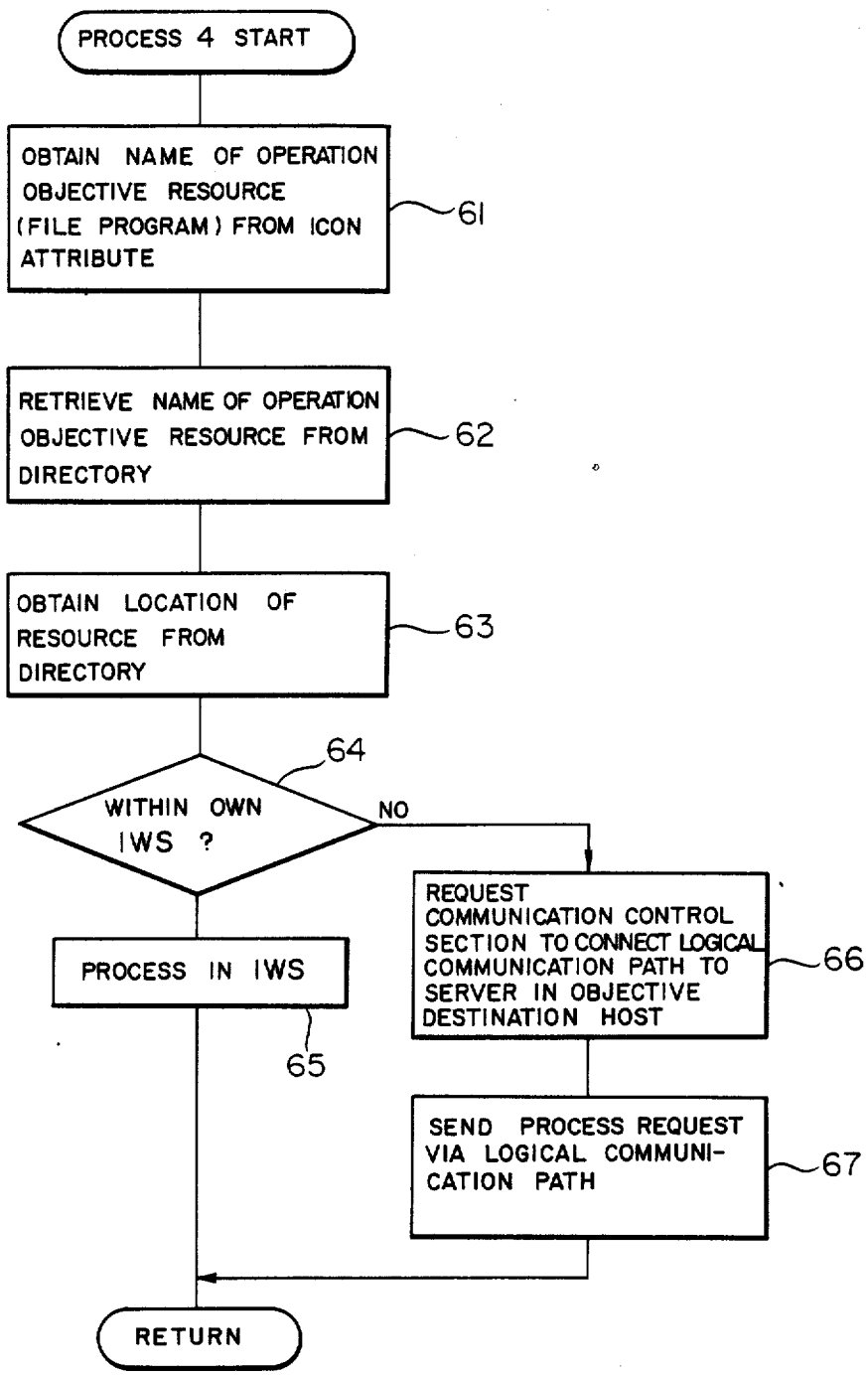

The initiated process $4_i$ obtains names of the processing objectives such as a file name and a program name extracted from the Icon attribute table 12. Since the processing objectives are entirely registered to a directory 13 in the IWS $1_1$ in advance, the locations thereof are determined by conducting a retrieval through the directory 13. The name of a processing objective comprises a name in which node names of the directory 13 are linked to each other, and hence the nodes of the relevant directory 13 can be directly traced by use of the name of the processing objective. As described above, the directory 13 is configured in a tree structure. Namely, in an upper node 13a of a node 13b of the determined objective, there is stored an existence location (indicating an existence processor name of a processor where the node 13b exists, or a destination processor name (host name) for other than the own processor). Consequently, the process $4_i$ can determine the destination or mate processor based on the name of the processing objective. The operation flow of the process $4_i$ is shown in the steps 61–67 of FIG. 6. Here, if the existence locations of the processing objectives are in the own IWS $1_1$, the processing request can be accomplished in the IWS $1_1$. If the existence locations are in another processor i.e. host, the directory 13 is searched to determine the name of the server $7_i$ in a host corresponding to the process $4_i$ in the IWS $1_1$. It is here assumed that the name of the server $7_i$ is stored in the storage within the IWS $1_1$ corresponding to the processing requested by the process $4_i$. When the host name and the name of the server $7_i$ in the host are determined, the process $4_i$ issues a connection request to the communication control section 5 to establish a connection of IWS $1_1$ to the objective server process $7_i$. Based on the previously defined information such as a protocol, the communication control section 5 connects the communication line $3_1$ to the destination processor i.e. relevant host computer $2_i$. After the connection is completed, the communication control section 5 transfers a connection request buffer 14 to the host 2.

In order to establish a logical communication path between the process $4_i$ and the server process $7_i$ to be connected in the host $2_i$, the communication control section 5 of the IWS $1_1$ generates a connection request buffer 14 providing information indicative of a logical request for connecting the name of the process $4_i$ and the name of the destination server process $7_i$, into a virtual memory of IWS $1_1$. When a logical communication path is established as a result, the process $4_i$ in the IWS $1_1$ can directly achieve communication with the server process $7_i$ of the host $2_i$. The contents of request buffer area 14 are transferred to the communication control space 6 including a local supervisor program of the host $2_i$ via the communication line $3_1$ connecting the IWS $1_1$ to the host $2_i$. The communication control space 6 has a function to accept a connection request and a processing request sent from the respective IWS $1_1$ and to distribute the received requests to the corresponding ones of the server processes $7_1$, $7_2$, $7_3$, . . . .

Figure 3:
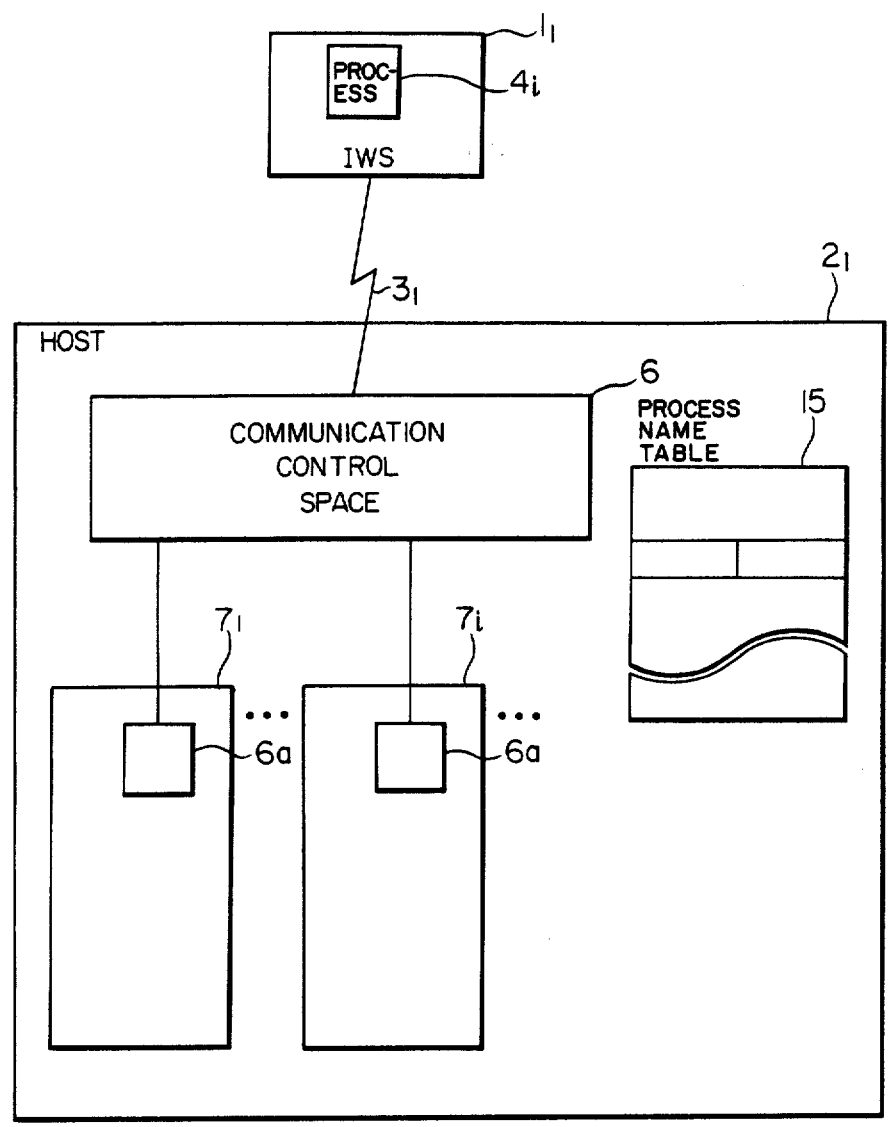
FIG. 3 is a schematic block diagram illustrating the operation on the host side.

Referring now to FIG. 3, the configuration and operation of the host $2_1$ will be described, by way of example.

The host $2_1$ includes the communication control space 6 for receiving the connection and processing requests from the IWS $1_1$ and for transferring the received requests to a relevant server $7_i$.

Information received via the communication line $3_1$ is stored in a buffer (area) existing in a virtual storage of the communication control space 6. The information sent from the IWS $1_1$ includes the name of the process $4_i$ as the source and the name of the server process $7_i$ as the destination. In addition, information indicating the content of the request is also included in the sent information. When the content of the request is to establish a logical communication path, the communication control space 6 obtains the name of the server process $7_i$ in the host for which the communication path is to be established by use of the information received via the communication line $3_1$. The server process $7_i$ is a process to implement a function on a particular operation objective contained in the request issued from the IWS $1_1$ to the host $2_1$. For example, the mail server accomplishes a function in the case where the operation objective is an electronic mail, namely, conducts the retrieval, distribution, and reception of the electronic mail. Moreover, there are provided the multi-media document server to store, to retrieve, and to extract the multi-media document; the print server to edit and to print the multi-media; and the data base server to retrieve, to store, and to extract the data base. At the initiation in the host 2, the server process $7_i$ conducts an initial report to the communication control space 6. Upon receiving the start request, the communication control space 6 registers to a process name table 15 the name of the server process $7_i$ received through the initiation report and the identifier of the space of the server process $7_i$.

When a request to establish a logical communication path is received from the IWS $1_1$, the communication control space 6 effects a retrieval on the process name table 15 by use of the server process name in the information transmitted together with the request and obtains the space of the server process $7_i$. In the server process $7_i$, a task called the communication control section $6a$ is beforehand initiated at the initiation report of the server process $7_i$ and is waiting for a report from the communication control space 6. The communication control space 6 transmits the report to the communication control section $6a$ in the server process $7_i$ by means of an interspace communication function (cross-memory post). On receiving the report from the communication control space 6, the communication control section $6a$ receives from the communication control space 6 the data indicating the request to establish a logical communication path, the data being transferred via an area of the virtual storage to be commonly used by the respective spaces 6 and $7_i$. In the case where the request to open the logical communication path is to be accepted, an acknowledge answer is returned to the communication control space 6. The acknowledge answer is reported by use of a cross-memory post generated in a buffer of the common virtual storage. The communication control space 6 passes the acknowledge answer via the communication line $3_1$ to the communication control section 5 of the IWS $1_1$. The communication control section 5 notifies the process $4_i$ from which the request has been issued that the logical communication path has been established.

Through the procedures above, the process $4_i$ in the IWS $1_1$ establishes the logical communication path to the server $7_i$ in the objective host $2_1$. In this operation, the identification number of the logical communication path is transferred to the process $4_i$ in the IWS $1_1$ and the server $7_i$ in the host $2_1$.

When the logical communication path is established, the process $4_i$ in the IWS $1_1$ is enabled to freely communicate with the server $7_i$, and then like in the TSS, the server $7_i$ in the host $2_1$ executes a processing for the function requested to the host $2_1$. To effect a particular request for the server $7_i$, the process $4_i$ generates request information in the virtual storage of the IWS $1_1$, specifies the identification number of the logical communication path, and notifies the information to the communication control section 5. The communication control section 5 then transmits the information to the communication control space 6 in the host $2_1$ via the communication line $3_1$. Based on the identifier of the logical communication path, the information is recognized to be destined to the server $7_i$; consequently, the information is delivered to the server $7_i$.

The server $7_i$ is a server for handling a particular operation objective, for example, a mail server for the electronic mail or the multi-media document server for the multi-media document.

Figure 7:
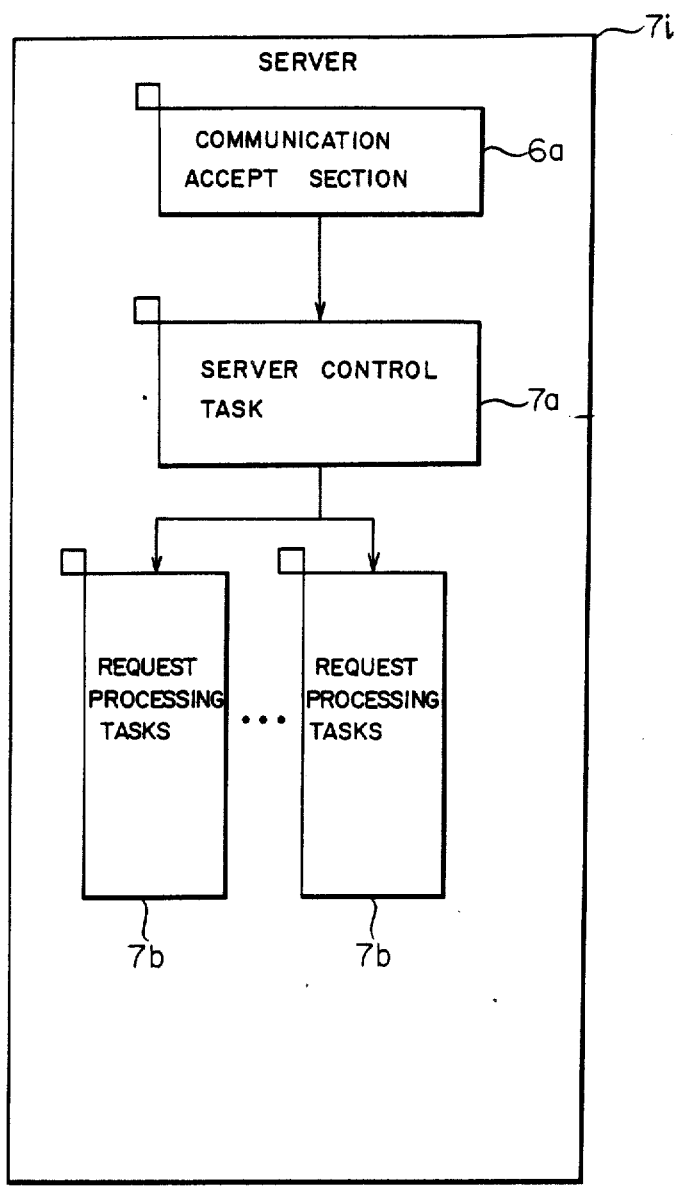
FIG. 7 is a block diagram exemplarily illustrating the configuration of the host.

Since the server handles only the particular operation objective, it is possible to beforehand effect the OPEN processing by allocating the necessary files to the space of the server $7_i$. To this end, in the space of each server $7_i$, the fixed files required to handle the operation objectives of the server are subjected to the OPEN processing at the initiation. FIG. 7 shows the general configuration of the server $7_i$, which comprises a communication accept section $6a$ for receiving data from the communication space 6, a server control task $7a$ for conducting analysis of the content of data transferred, and a plurality of request processing tasks $7b$ for implementing the functions of the requests.

The server task 7a issues a connect request to the communication control space 6 at the initiation, and as a result of the request, the communication accept section 6a is generated as a task. The server control task 7a then allocates the necessary files, opens the files, and waits for a request sent from the IWS side 1.

On receiving a processing request after the logical communication path to for example, the IWS $1_1$ is opened, the server $7_i$ analyzes the request by use of the server control task 7a. As a result, if the pertinent request processing task 7b has already been assigned, the server $7_i$ passes the request to the request processing task 7b; otherwise, the server $7_i$ selects a free task 7b and assignes the request to the task 7b. The request processing task 7b effects the processing in accordance with the content of the request from the IWS $1_1$. The processing result is returned to the process $4_i$ in the IWS $1_1$ by means of the same logical communication path $3_1$.

As described above, the server $7_i$ is a processing space in which the environment is arranged to meet the particular processing request (i.e. the file allocation and the OPEN processing of the files have been completed). Although each server $7_i$ can effect a processing execution only for a particular processing request, a plurality of requests can be received, namely, the requests from many IWS's can be simultaneously processed with respect to the space by use of, for example, the technology of the time slicing.

When the user's request to operate the IWS $1_1$ is changed and a change-over function to change over control to another server becomes necessary, the analyze/status control section 11 in the IWS $1_1$ initiates a process corresponding to a new Icon and then a connection to a new server in the host $2_1$ is established in accordance with the IWS-host connect procedure. This connection is independent of the previous connection, namely, the previous connection may be retained to be used again when necessary. If such a connection is unnecessary, the connection is released as soon as possible. If necessary, a plurality of requests may be concurrently issued by use of two connections at the same time so as to be processed concurrently.

An example to effect the change-over of servers 7 in the IWS 1 is as follows.

An electronic mail is received (by the electronic mail server), the electronic mail is stored in an electronic cabinet (multi-media document store file) by means of the multi-media document server, and the document is printed by use of the print server.

This sequence of processing is implemented as follows. In accordance with a request issued from the IWS 1 operator, the electronic server is connected to the IWS 1, a request is issued to the electronic mail server to achieve the "electronic mail receive" function. Next, the multi-media server is connected and a request is made to the multi-media server to conduct the "store" function, and finally, the print server is connected and then a request is issued thereto to effect the "print" function.

According to the embodiment, since the user's request is analyzed in the IWS 1 and the processing environments (allocation and OPEN processing of files, development of tables in the memory, etc.) need not be set in each server of the host, and the server processes requests from a plurality of IWS's, which enables the number of server spaces to be limited, the load on the host can be reduced. Consequently, the number of IWS's to be connected to the host can be increased by the magnitude on the order of ten as compared with that of the prior art TSS.

Moreover, in some cases, the server satisfying the processing request need not be necessarily allocated to a particular host, namely, data such as documents and tables of each host can be freely and in the same procedure accessed through the server of the common kind disposed in each host.

Figure 8:
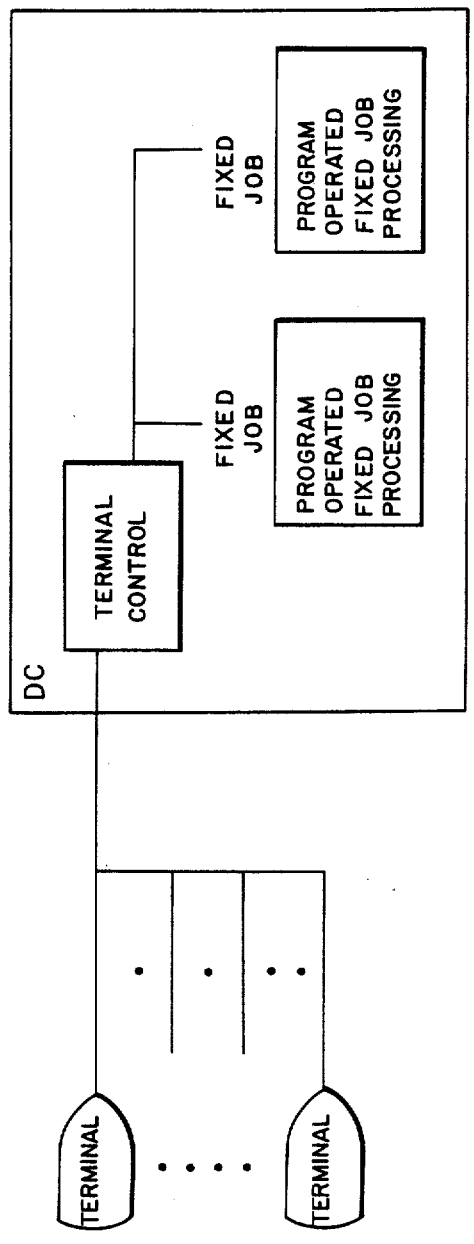
FIGS. 8 and 9 are explanatory diagrams for explaining the prior art TSS and on-line system, respectively.
Figure 9:
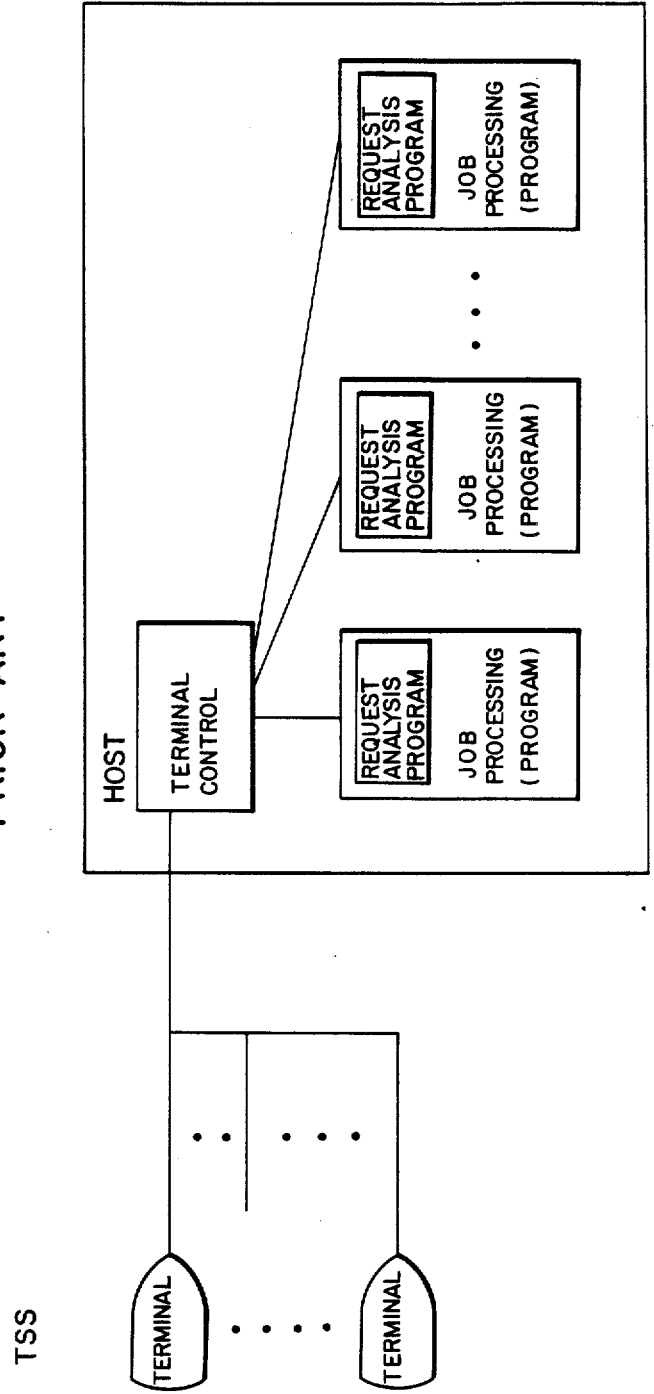
Figure 10:
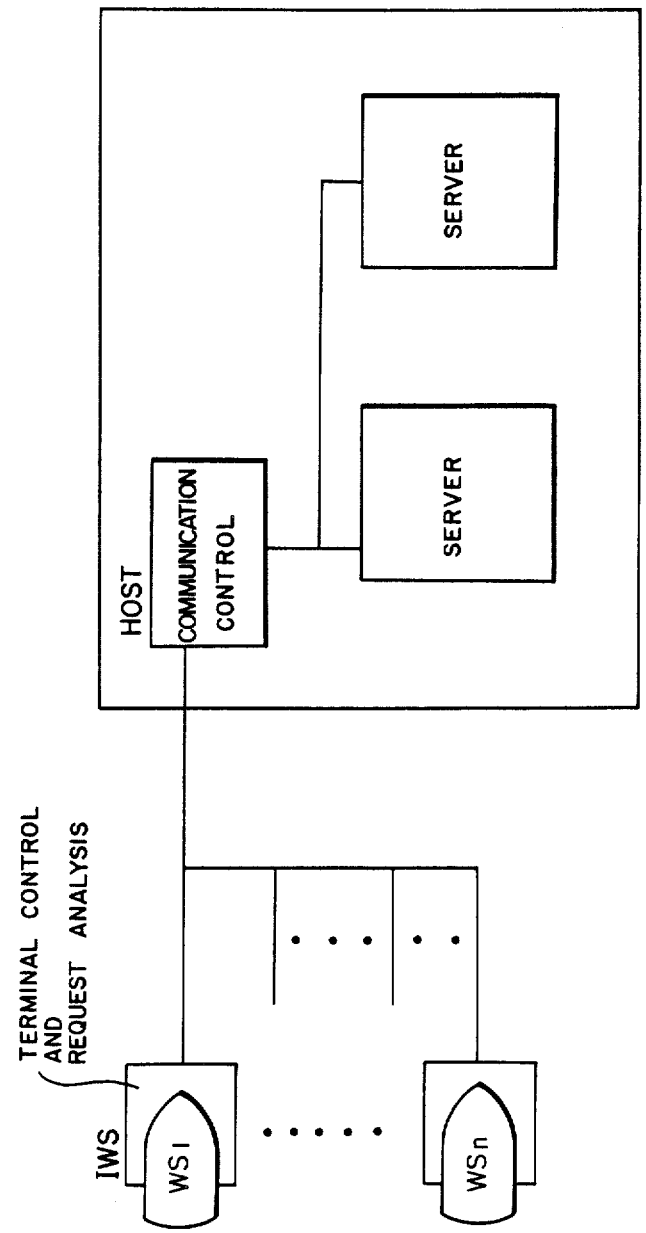
FIG. 10 is a conceptual diagram of the present invention useful for the comparison with the systems of FIGS. 8 and 9.

Comparing now the method of the present invention with the prior art examples of FIGS. 8 and 9, in the distributed interactive system of the present invention of FIG. 10, IWS's 1 are located on a plurality of terminal sides like in the on-line system to effect on the terminal sides the analysis of the request input from the terminal user, and on the host side, there are provided a communication program for conducting communications with the programs (processes) on the IWS 1 side and various servers each having a single function; consequently, processing requested from the plural IWS's can be collectively or concurrently be accomplished. As a result, although the regular job and the irregular job can be processed in the present system, the range of the job may be limited depending on the kinds of servers.

It will be noted that the following advantages are obtained according to the present invention.

(1) In the conventional TSS, each TSS terminal has an individual space, and hence a great number of spaces are required. As a consequence, all spaces cannot be located in the memory and the processing is therefore executed by effecting a swap-out operation. Moreover, the change-over between spaces must be quite frequently achieved, which leads to a great overhead.

According to the present method, the number of server spaces is limited and hence the overhead associated with the number of spaces is reduced.

(2) Since the operation objective of each server is clearly specified, the environments necessary to implement the particular function such as the tables and files in the memory can be kept prepared in advance.

(3) Since the request is analyzed on the IWS side and the destination server is also determined therein, the special space to effect the request analysis is not necessary for the server on the host side, namely, the individual space required in the case of the TSS becomes unnecessary.

As a result, the host can dedicatedly effect the server processing.

While the present invention has been described with reference to the particular embodiment, it is not restricted by the embodiment but only by the appended claims. It is to be appreciated that those skilled in the art can change or modify the embodiment without departing from the scope and spirit of the invention.

We claim:

1. A method of distributed interactive processing in a composite computer system including at least a work station as a terminal for supporting a first group of server processes and including input means for inputting a request, at least a host computer for supporting a second group of server processes, communication lines connected between said at least a work station and said at least a host computer, and control means included in each of said at least a work station and said at least a host computer for controlling said communication lines to allow communications between said at least a work station and said at least a host computer said method comprising the steps of:

in each of said at least a work station issuing a request for performing a processing from said input means, analyzing said request in said work station and performing a process corresponding thereto in said work station when said request is for a process belonging to said first group of server processes, and outputting server process information corresponding to said request from said work station to said host computer when said request is for a process belonging to said second group of server processors, said server process information identifying a server process of said second group of server processes; and in each of said at least a host computer, in response to said server process information output from said work station, wherein said server process information designates a file name and a program name of a process available for execution, allotting and executing an available one of a plurality of server processes corresponding to said file name and said program name.

2. a method of distributed interactive processing in a composite computer system including at least a work station as a terminal for supporting a first group of server processes and including input means for inputting a request, at least a host computer for supporting a second group of server processes, communication lines connected between said at least a work station and said at least a host computer, and control means included in each of said at least a work station and said at least a host computer for controlling said communication lines to allow communications between said at least a work station and said at least a host computer said method comprising the steps of:

in each of said at least work station issuing a request for performing a processing from said input means, analyzing said request in said work station and performing a process corresponding thereto in said work station when said request is for a process belonging to said first group of server processes, and outputting server process information corresponding to said request from said work station to said host computer when said request is for a process belonging to said second group of server processors, said server process information identifying a server process of said second group of server processes; and in each of said at least a host computer, in response to said server process information output from said work station, wherein said server process information designates a file name and a program name of a process available for execution, allotting and executing an available one of a plurality of server processes corresponding to said file name and said program name; wherein said request issuing and said analyzing steps performed in at least a work station includes a step responsive to a processing request inputted by said input means to analyze the processing request and determine which work station or host computer is provided with an executable program corresponding to the processing request.

3. A distributed interactive processing method according to claim 2 wherein said analyzing step includes a substep of supplying said control means of said a least a host computer with a name of a server process when said at least a work station detects that a particular server process in a particular one of said at least a host computer is requested by said request, and providing, by said control means of said at least a host computer, a particular server process of said host computer to said at least a work station in accordance with said name of said server process.

4. A distributed interactive processing method according to claim 3 wherein said server process includes processes each prepared to process a particular kind of request.

5. A distributed interactive processing method according to claim 2 wherein said analyzing step includes the following substeps of:

analyzing an input request;

determining a process name for the analyzed request by reference to a table provided in said at least a work station, said table including process names of processes which are executable in the work stations independently;

obtaining a name of a file to be processed by executing a process corresponding to the determined process name; and determining an existence of a location of the file to be processed in said at least a work station by reference to a directory provided in said at least a work station based on the analyzed request.

6. A composite computer system including a plurality of work stations (IWS's), at least a host computer (HOST), communication lines connected between the plurality of IWS's and said HOST, and communication control means for establishing and controlling communication paths between processes to conduct a communication between IWS's and said HOST, said computer system comprising:

said plurality of work stations, each work station including input means for receiving a request for a processing from a user, a process name table in which names of processes to respectively perform processings for various processing requests are registered, means responsive to a processing request from said input means for determining the name of a process corresponding to the processing request by reference to said process name table and for initiating a process having said process name, a directory in which file names and file locations of files to be processed for requests are beforehand registered, process execution means for executing the initiated process, said process execution means referring to said directory to determine whether a location of a requested file is in said IWS which has issued a request, said process execution means executing a processing for the file in the IWS when the requested file is in the IWS, and determining a server means of a HOST corresponding to the initiated process and issuing a connect request to the HOST, and IWS communication control means responsive to the connect request from said process execution means for providing a server process in said HOST corresponding to said determined server name to said IWS through said communication line; and said at least a host computer including HOST communication control means for controlling, receiving and transferring communication information from each of said IWS's, said HOST communication control means including means for storing information from said communication lines, said information including a process name of a source IWS issuing a request, a name of a server process as a communication destination in the HOST, and information indicating the content of the request from the IWS, and server process execution means responsive to information from said HOST communication control means for executing a server process.

7. A composite computer system according to claim 6 wherein:

said HOST includes a process name table in which names of server processes and identifiers of server spaces associated with respective server processes are registered, said server spaces being address spaces on said HOST used for execution of said server processes;

said server process execution means includes a communication accept portion for receiving address space information of a corresponding server space which is obtained by said HOST communication control means by referring to said process name table in response to the information from the IWS; and said communication accept portion establishing, upon issuance of an acknowledge answer from said corresponding HOST server, a connection between the process in the IWS and the corresponding server in the HOST.

* * * * *